June 11, 1968  J. A. NEBEL  3,387,519
STRIPPER ASSEMBLIES FOR SLITTING SHEARS
Filed Feb. 1, 1966
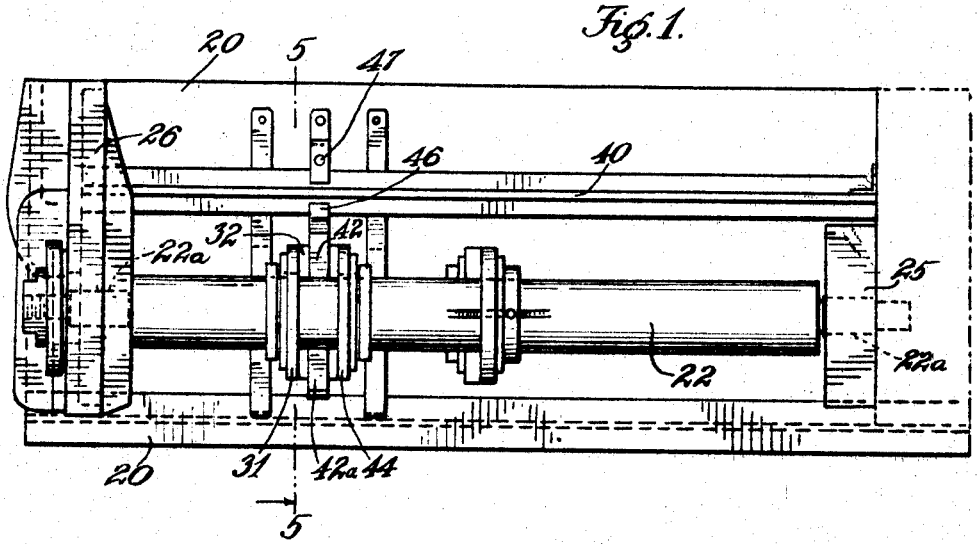
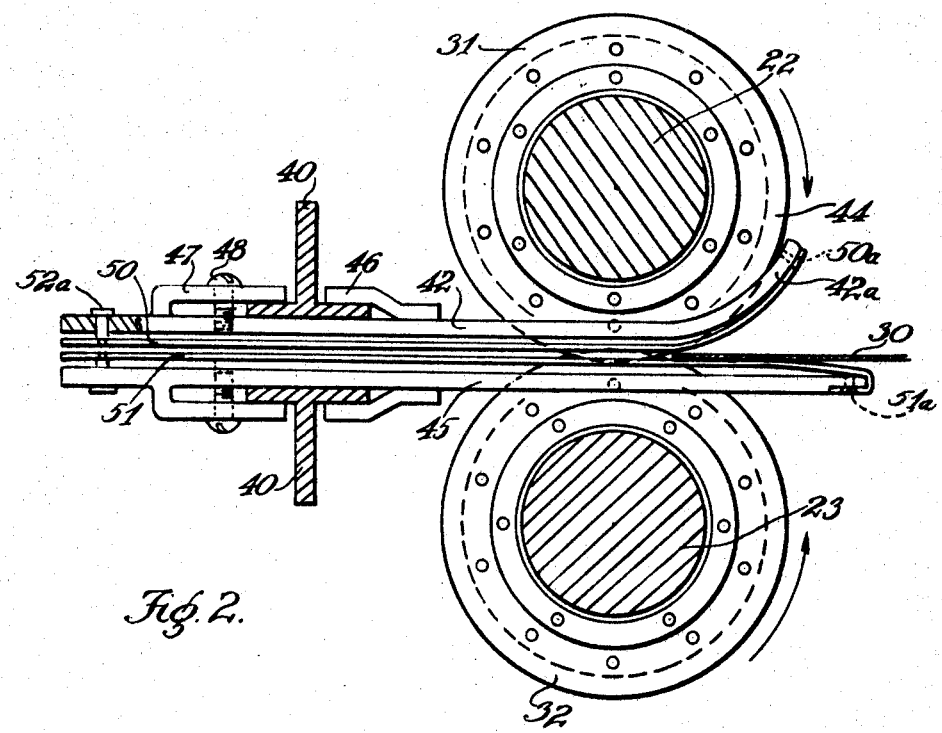
Inventor:
Joseph A. Nebel
By Stevens, Pehrson & Stevens
Attorneys.

3,387,519
STRIPPER ASSEMBLIES FOR SLITTING SHEARS
Joseph A. Nebel, 3004 W. 111th St.,
Chicago, Ill. 60655
Filed Feb. 1, 1966, Ser. No. 526,958
6 Claims. (Cl. 83—118)

ABSTRACT OF THE DISCLOSURE

A stripper assembly for sheet material passed between rotary cutters comprising upper and lower transverse supports in the departing zone of the work, each support having a stripper clamped to it. The strippers are rigid and lined along their facing sides with strips secured to the related strippers in the inserting zone of the work. The strips are normally spaced in the departing zone thereof, but tensionable to yield when material of extra thickness is inserted between the cutters. The strips are limited from gathering closer than their normal spacing by having pins projecting outwardly through the related strippers to terminate with heads on the outside. The supports are T-bars with heads in opposed relation; and such heads are engaged by clamps from the strippers to secure them to the T-bars.

---

My invention relates to shears for slitting sheet metal, and more particularly to the type in which a pair of geared shafts are journaled in a frame and carry pairs of rotary cutters between which the work is fed, such cutters being movable along the shafts to space them according to the width at which the work sheet is to be slitted. In conventional slitting shears, when the work is slit into anrrow strips, the cutters tend to curl or roll the strips away from the issuing or departing course of the work. To counteract this tendency, strippers have been provided with supports on the receiving side of the shear. However, owing to the traveling length of the work from such side through the shear, the strippers must be made of heavy section spring steel in order to remain rigid, since the strain on the cutters would wrap strippers ol lighter or milder steel around the arbors, and even break a stripper, as the work sheet is being slitted.

In order to depart from the above difficulty, it is one object of the present invention to mount a support in the shear which is on the departing side of the slitting operation, with strippers carried at desired points, such strippers being of relatively light gauge and self-adjusting to the thickness of the work sheet.

A further object is to design the novel stripper assembly along lines of compactness and simplicity.

A better understanding of the invention may be gained by reference to the accompanying drawing, in which FIG. 1 is a top plan view from the front of the shear, showing the stripper installations; and FIG. 2 is an enlarged section on the line 2—2 of FIG. 1.

Referring specifically to the drawing, 20 denotes the base of the shear, and 22 and 23 the parallel shafts above the same which carry the slitting cutters. These shafts extend crosswise of the shear as viewed from the front, and have terminal reductions 22a entering frame sections 25 and 26 at the sides of the shear. The frame section 25—which is at the right—contains a power drive (not shown) to operate the shafts 22 and 23 at the same speed in opposite directions, according to the arcuate arrows in FIG. 2, as is the practice in rotary shears. A work sheet 30 is fed between a pair of rotary cutters 31 and 32.

The application of strippers wherever cutters are located along the shafts 22 and 23 employs a set of supports at the rear of the shafts, such supports comprising T-bars 40 extending crosswise of the shear and supported at the ends in the frame sections 25 and 26. The T-bars are arranged with their heads in opposed relation, as shown in FIG. 2. The strippers are applied along the head flanges of the T-bars by clamping means. Thus, the upper stripper is shown at 42; and it extends forwardly along a cutter 44 to terminate with an upward curve, as shown at 42a. The lower stripper 45 takes a level course, and terminates with a slight decline. The strippers are formed with receptacles 46 in front and arms 47 at the rear, both applicable to the T-bar head flanges as clamps; and a bolt 48 secures the flanges between arms 47 and the related strippers. A pair of spring blades 50 and 51 line the strippers on the inner sides. The front ends of the blades are secured to the related strippers by screws 50a and 51a; and the rear ends carry pins 52 passing freely through the related strippers to terminate with heads 52a in order to keep the blades from gathering closer than their normal spacing. Thus, the blades are tensioned to engage the work sheet 30 as it is slid through the shear and keep it in the feeding course; and the yielding factor of the blades permits the strippers to accommodate work sheets of added thickness.

It is now apparent that the improved stripper assembly is an efficient mechanism. It is significant that the less the width of the slitted strips the stronger the pull of the cutters to draw them into the departing turns of the cutters. Consequently, the improved strippers—supported at the rear or departing side of the cutters—are constituted to resist the diverting pull on the strips sheared from the work sheet and keep them sliding through the strippers without incident. Further, the blade inserts between the strippers are self-adjusting to work sheets of different thickness. Finally, the novel stripper assembly is of compact and sturdy construction.

I claim:

1. In a slitting shear, the combination with a pair of rotary cutters between which a work sheet is insertible; of a pair of spaced supports extending transversely of the cutters in the work-departing zone, and a stripper assembly carried by said supports, said assembly comprising upper and lower strippers extending from the work-receiving zone to the work-departing zone, and resilient elements secured to the strippers in the work-receiving zone and extending between the strippers into the work-departing zone.

2. In a slitting shear, the combination with a pair of rotary cutters between which a work sheet is insertible; of a pair of spaced supports extending transversely of the cutters in the work-departing zone, and a stripper assembly carried by said supports, said assembly comprising upper and lower strippers extending from the work-receiving zone to the work-departing zone, and spring blades secured to the strippers in the work-receiving zone and extending between the strippers into the work-departing zone, said blades being normally spaced from the related strippers and yielding toward them when a work sheet of added thickness is slitted.

3. In a slitting shear, the combination with a pair of rotary cutters between which a work sheet is insertible; of a pair of spaced supports extending transversely of the cutters in the work-departing zone, and a stripper assembly carried by said supports, said assembly comprising upper and lower strippers extending from the work-receiving zone to the work-departing zone, resilient elements secured to the strippers in the work-receiving zone and extending between the strippers into the work-departing zone, and pins carried by said elements and slidable in the related strippers.

4. In a slitting shear, the combination with a pair of rotary cutters between which a work sheet is insertible; of a pair of spaced supports extending transversely of the cutters in the work-departing zone, and a stripper assembly carried by said supports, said assembly comprising upper and lower strippers extending from the work-receiving zone to the work-departing zone, resilient elements secured to the strippers in the work-receiving zone and extending between the strippers in the work-departing zone, and pins carried by said elements and slidable in the related strippers, such pins having heads at their outer ends to prevent said elements from gathering closer than their normal spacing.

5. In a slitting shear the combination with a parallel pair of shafts carrying rotary cutters between which a work sheet is insertible, and upper and lower strippers extending between the shafts; of supporting means for the strippers comprising upper and lower T-bars extending transversely of the cutters with heads in opposed relation, and clamps carried by the strippers and receiving the head portions of the T-bars from opposite sides thereof.

6. The structure of claim 5, the clamps nearer to the cutters being flanges with offset receiving portions, and the other clamps being flanges from which bolts are driven into the strippers.

UNITED STATES PATENTS
References Cited

| | | | |
|---|---|---|---|
| 303,893 | 8/1884 | Stewart | 83—122 |
| 2,202,843 | 6/1940 | Edwards | 83—122 X |
| 2,486,786 | 11/1949 | Holtshauser | 83—446 |

FOREIGN PATENTS

| | | |
|---|---|---|
| 65,852 | 3/1943 | Norway. |

JAMES M. MEISTER, *Primary Examiner.*